(12) United States Patent
 Caliskan

(10) Patent No.: US 12,233,700 B2
(45) Date of Patent: Feb. 25, 2025

(54) STRUCTURAL ASSEMBLY AND VEHICLE HAVING STRUCTURAL ASSEMBLY

(71) Applicant: Ford Global Technologies, LLC, Dearborn, MI (US)

(72) Inventor: Ari Garo Caliskan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 354 days.

(21) Appl. No.: 17/957,478

(22) Filed: Sep. 30, 2022

(65) Prior Publication Data

US 2024/0109407 A1   Apr. 4, 2024

(51) Int. Cl.
| | |
|---|---|
| *B60K 1/04* | (2019.01) |
| *B60L 50/60* | (2019.01) |
| *B60L 50/64* | (2019.01) |
| *B62D 25/20* | (2006.01) |

(52) U.S. Cl.
CPC ............... *B60K 1/04* (2013.01); *B60L 50/66* (2019.02); *B62D 25/20* (2013.01); *B60K 2001/0438* (2013.01)

(58) Field of Classification Search
CPC .......... B60K 1/04; B62D 25/20; B62D 21/02; H01M 50/249; H01M 50/262; H01M 50/244; H01M 50/204; H01M 50/66; B60L 50/66; B60L 50/64; B60L 50/60
See application file for complete search history.

(56) References Cited

U.S. PATENT DOCUMENTS

| | | | |
|---|---|---|---|
| 9,796,424 B2 * | 10/2017 | Sakaguchi | ......... B62D 25/2036 |
| 10,723,385 B2 * | 7/2020 | Ayukawa | ........... B62D 25/2009 |
| 2020/0023905 A1 | 1/2020 | Kawase | |
| 2021/0078638 A1 | 3/2021 | Hirota | |
| 2021/0184191 A1 | 6/2021 | White et al. | |

* cited by examiner

*Primary Examiner* — John D Walters
(74) *Attorney, Agent, or Firm* — Burris Law, PLLC

(57) ABSTRACT

A structural assembly for an electric vehicle includes a battery structure, a pair of mounting structures, lower fasteners and upper fasteners. The battery structure is configured to house power storage units. Each mounting structure is secured to a respective side of the battery structure. Each lower fastener extends through a lower portion of a respective mounting structure and a bottom portion of a respective rocker of the vehicle body. Each upper fastener extends through an upper portion of the respective rocker and a top portion of the respective mounting structure. The upper fasteners secure the battery pack and the vehicle body at an upper attachment point and the lower fasteners secure the battery pack and the vehicle body at a lower attachment point. The lower attachment point is vertically offset from the upper attachment point.

20 Claims, 6 Drawing Sheets

STRUCTURAL ASSEMBLY AND VEHICLE HAVING STRUCTURAL ASSEMBLY

FIELD

The present disclosure relates to a structural assembly and a vehicle having a structural assembly.

BACKGROUND

The statements in this section merely provide background information related to the present disclosure and may not constitute prior art.

Electric vehicles differ from conventional motor vehicles because they are powered by one or more rechargeable battery packs having lithium-ion batteries, for example, or any other suitable electrical power storage units. The battery pack typically powers one or more motors to drive a set of wheels. The size and weight of the battery pack is typically greater for electric vehicles capable of traveling long distances (e.g., electric vehicles capable of traveling more than 500 miles). Depending on the mounting location relative to the rest of the electric vehicle, the battery pack may be susceptible to various vehicle loads.

Integration of rechargeable battery packs into the structure of existing vehicles and providing efficient load paths in a variety of operating conditions can be challenging, primarily due to the increased weight of the battery packs and their larger footprint in the vehicle.

The present disclosure addresses these and other issues related to the integration of rechargeable battery packs in electric vehicles.

SUMMARY

This section provides a general summary of the disclosure and is not a comprehensive disclosure of its full scope or all of its features.

In one form, the present disclosure provides a structural assembly for an electric vehicle that includes a vehicle body, a battery structure, a pair of mounting structures, lower fasteners, and upper fasteners. The vehicle body includes opposed rockers. The battery structure is disposed between the opposed rockers and is configured to house power storage units. Each mounting structure of the pair of mounting structures is secured to a respective side of the battery structure. Each lower fastener extends through a lower portion of a respective mounting structure and a bottom portion of a respective rocker of the vehicle body to secure the battery pack to the vehicle body. Each upper fastener extends through an upper portion of the respective rocker and a top portion of the respective mounting structure to secure the battery pack to the vehicle body. The upper fasteners secure the battery pack and the vehicle body at an upper attachment point and the lower fasteners secure the battery pack and the vehicle body at a lower attachment point. The lower attachment point is vertically offset from the upper attachment point.

In variations of the structural assembly of the above paragraph, which may be implemented individually or in combination: the upper fasteners are located inboard of the lower fasteners; the respective rocker and the respective mounting structure are arranged in a side-by-side configuration; the respective rocker has a width that is greater than a width of the respective mounting structure; the respective rocker and the respective mounting structure include internal stiffening members; the respective rocker has a height that is greater than a height of the respective mounting structure; the respective rocker includes a first body portion and a first flange portion, the first flange portion extends inwardly from the first body portion and engages the battery structure; the respective mounting structure includes a second body portion and a second flange portion, the second flange portion extends outwardly from the second body portion and engages the respective rocker; the first body portion and the second body portion are spaced apart from each other; the first body portion and the second body portion include internal stiffening members; the respective rocker is supported on the second flange portion of the respective mounting structure; each lower fastener extends through second flange portion of the respective mounting structure and the bottom portion of the respective rocker of the vehicle body; and each upper fastener extends through the first flange portion of the respective rocker and the top portion of the respective mounting structure.

In another form, the present disclosure provides a structural assembly for an electric vehicle that includes a vehicle body, a battery structure, a pair of mounting structures, lower fasteners, and upper fasteners. The vehicle body includes opposed rockers. Each rocker includes a first body portion and a first flange portion. The first flange portion extends inwardly from the first body portion. The battery structure is disposed between the opposed rockers and is configured to house power storage units. Each mounting structure of the pair of mounting structures is secured to a respective side of the battery structure and includes a second body portion and a second flange portion. The second flange portion extends outwardly from the second body portion. Each lower fastener extends through the second flange portion and a bottom portion of a respective rocker of the vehicle body to secure the battery pack to the vehicle body. Each upper fastener extends through the first flange portion of the respective rocker and a top portion of the respective mounting structure to secure the battery pack to the vehicle body. The upper fasteners are located inboard of the lower fasteners.

In yet another form, the present disclosure provides a structural assembly for an electric vehicle that includes a battery structure, a pair of mounting structures, lower fasteners, and upper fasteners. The battery structure is disposed between opposed rockers and is configured to house power storage units. Each mounting structure of the pair of mounting structures is secured to a respective side of the battery structure. Each lower fastener extends through a lower portion of a respective mounting structure and is configured to extend through a respective rocker to secure the battery pack to the vehicle body. Each upper fastener is configured to extend through the respective rocker and extends through a top portion of the respective mounting structure to secure the battery pack to the vehicle body. The upper fasteners are located inboard of the lower fasteners. The lower fasteners are aligned along a longitudinal direction of the electric vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
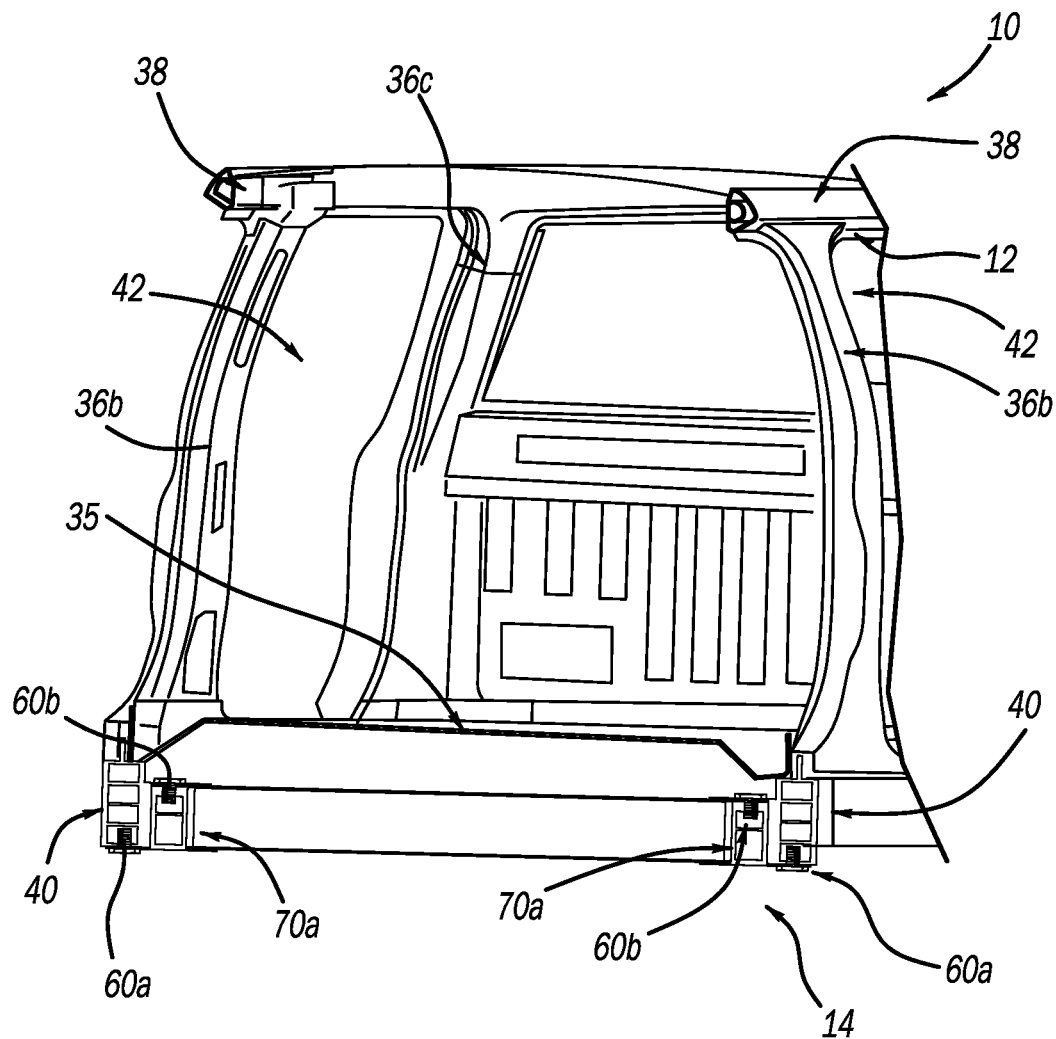
FIG. 1 is a cross-sectional perspective view of a vehicle including a vehicle body and a battery structure according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. The vehicle 10 includes a vehicle body 12 and a battery structure 14. The vehicle body 12 includes a front end (not shown), a plurality of pillars (e.g., A-pillars (not shown), B-pillars 36b, C-pillars 36c (one of which is shown), hinge pillars (not shown)), roof rails 38, and rockers 40. In one example, the front end includes a bumper structure (not shown) extending in a transverse direction relative to a longitudinal direction of the vehicle 10.

The A-pillars, the B-pillars 36b, the hinge pillars, the rockers 40 and the roof rails 38 cooperate to define front door openings (not shown) in the vehicle body 14. The B-pillars 36b, the C-pillars 36c, the rockers 40 and the roof rails 38 cooperate to define rear door openings 42 in the vehicle body 12. Doors (not shown) are rotatably coupled to the vehicle body 12 (e.g., hinge pillars or the B-pillars 36b) to be rotated between a closed position in which the doors are disposed within the front door openings or the rear door openings 42, and an open position (not shown) in which the doors are removed from the front door openings or the rear door openings 42. The vehicle body 12 also includes cross members 35 extending above the battery structure 14.

Each rocker 40 is elongated and extends along the longitudinal direction of the vehicle 10. A front end of the rocker 40 is housed within or otherwise secured to a respective hinge pillar (i.e., the front end of the rocker 40 may be disposed within a cavity of the respective hinge pillar).

Figure 3:
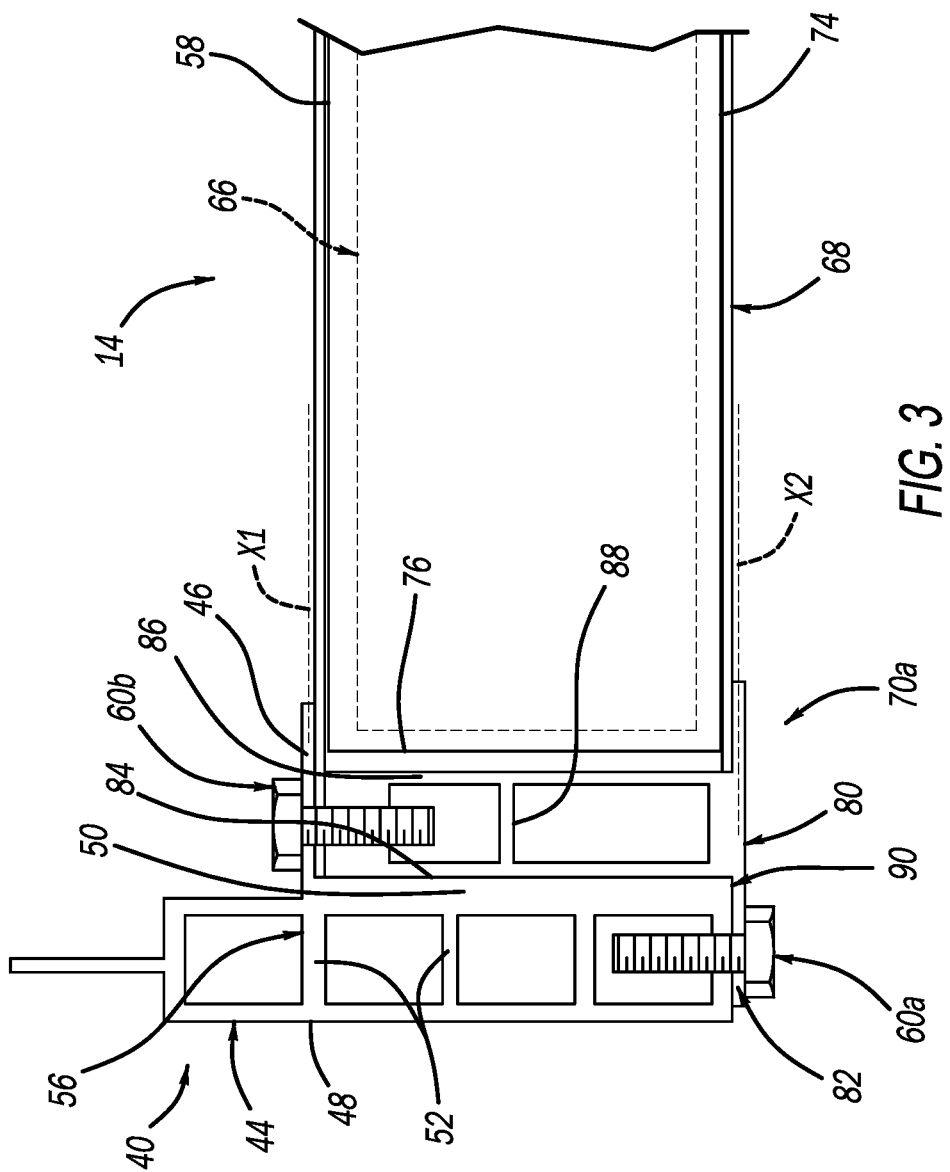
FIG. 3 is a cross-sectional view of a portion of the vehicle body secured to the battery structure of FIG. 1.
Figure 4A:
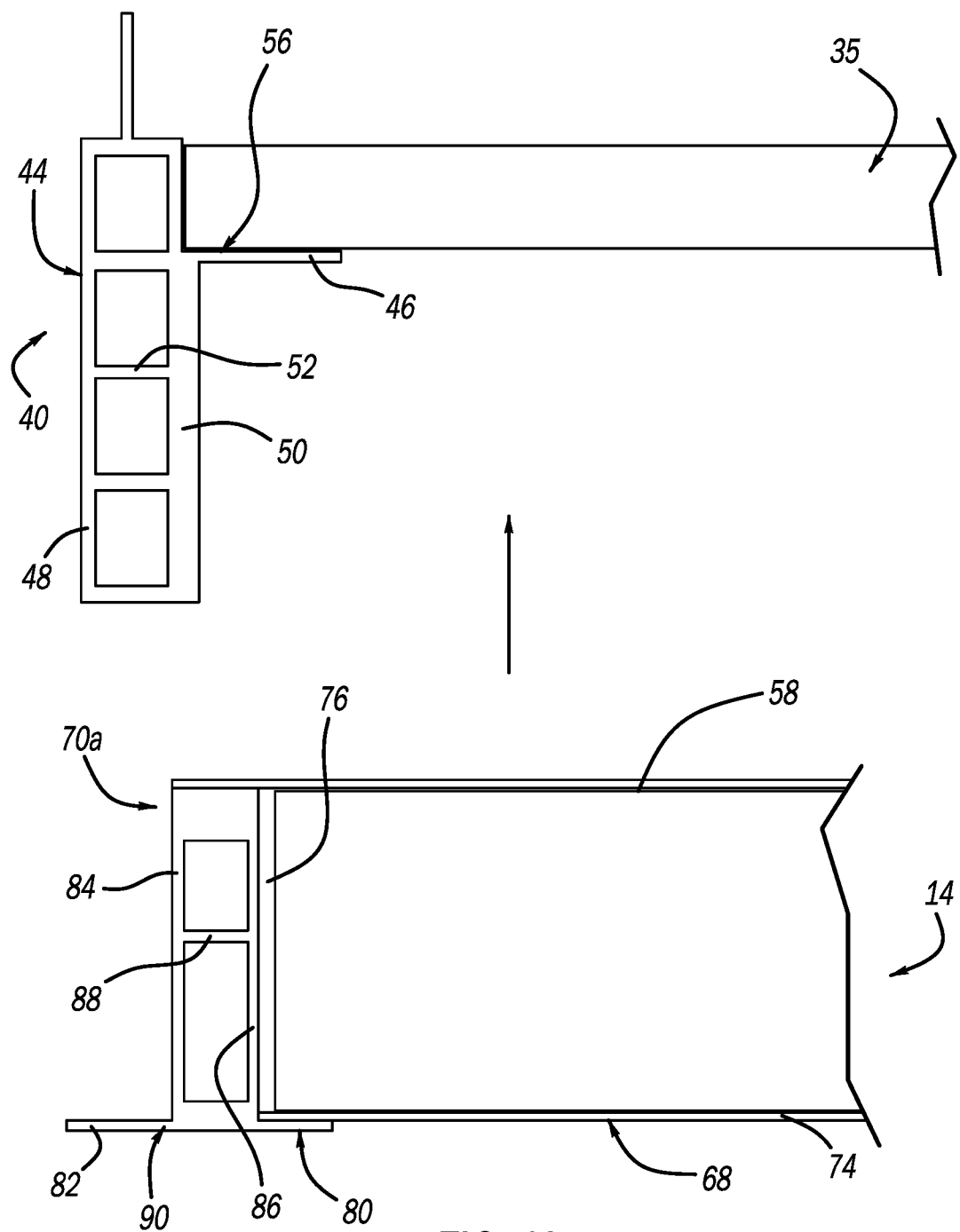
FIGS. 4A and 4B are cross-sectional views the battery structure being assembled to the vehicle body of the vehicle of FIG. 1.
Figure 4B:
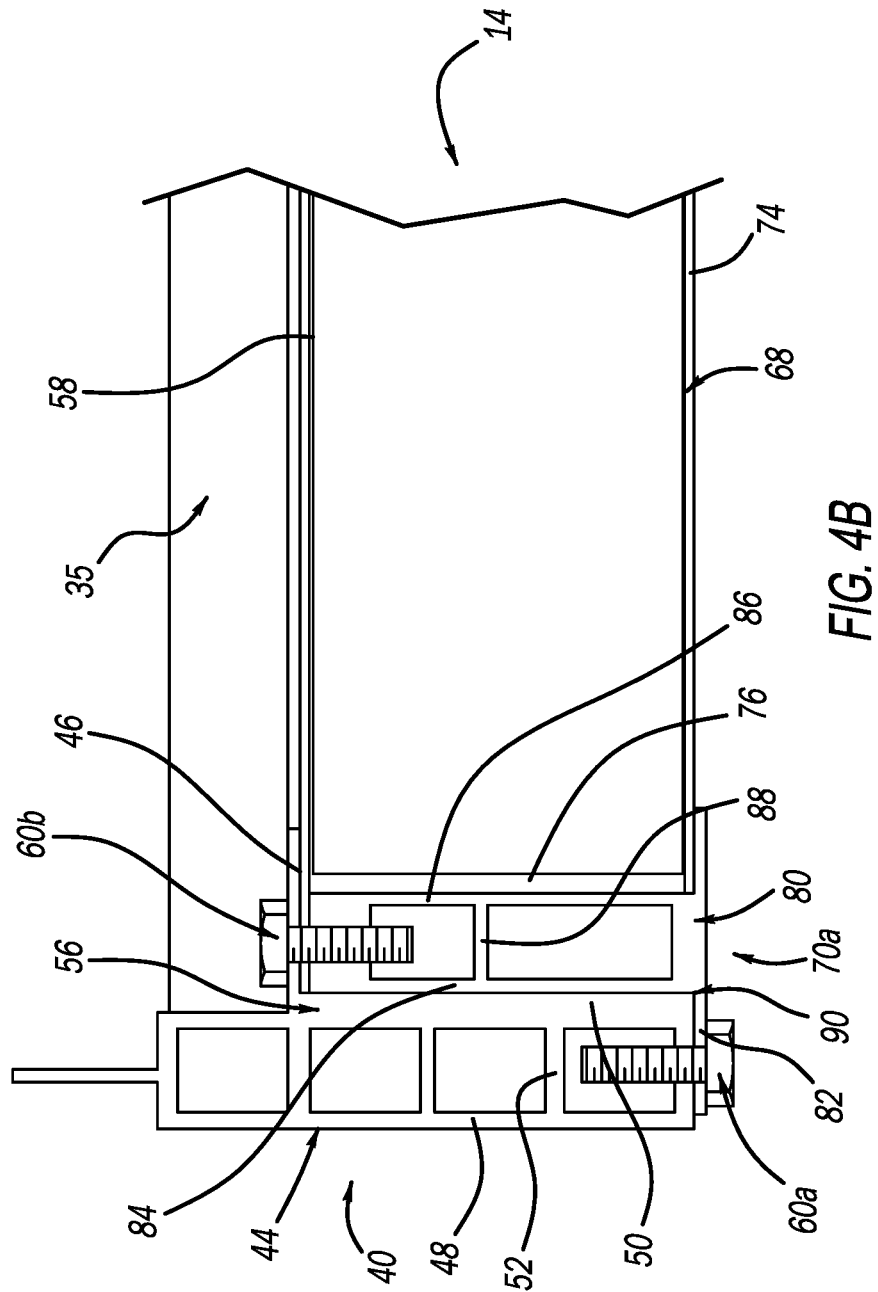

With reference to FIGS. 3, 4A, and 4B, the rocker 40 is secured (e.g., welded or fastened) to the cross members 35 of the vehicle body 12 and includes a body portion 44 and a flange portion 46. The body portion 44 includes an outboard vertical wall 48, an inboard vertical wall 50 and internal stiffening members 52 connecting the outboard vertical wall 48 and the inboard vertical wall 50 to each other. In the example illustrated, the internal stiffening members 52 include webbing extending in a horizontal direction and connecting the outboard vertical wall 48 and the inboard vertical wall 50 to each other. In some configurations, the internal stiffening members 52 may extend in an oblique direction, in addition to, or instead of, the horizontal direction. In other examples, a foam material may be provided instead of, or in addition to, the internal stiffening members 52 to further absorb energy during a side vehicle impact event.

The flange portion 46 extends inwardly toward the battery structure 14 from an upper section 56 of the body portion 44 and is disposed between the battery structure 14 and the cross members 35. Stated differently, the flange portion 46 extends inwardly from the inboard vertical wall 50 of the body portion 44 and is above and overlaps with a lid 58 of the battery structure 14. The flange portion 46 is flat and defines a plane X1 (FIG. 3) extending in a horizontal direction.

Figure 5:
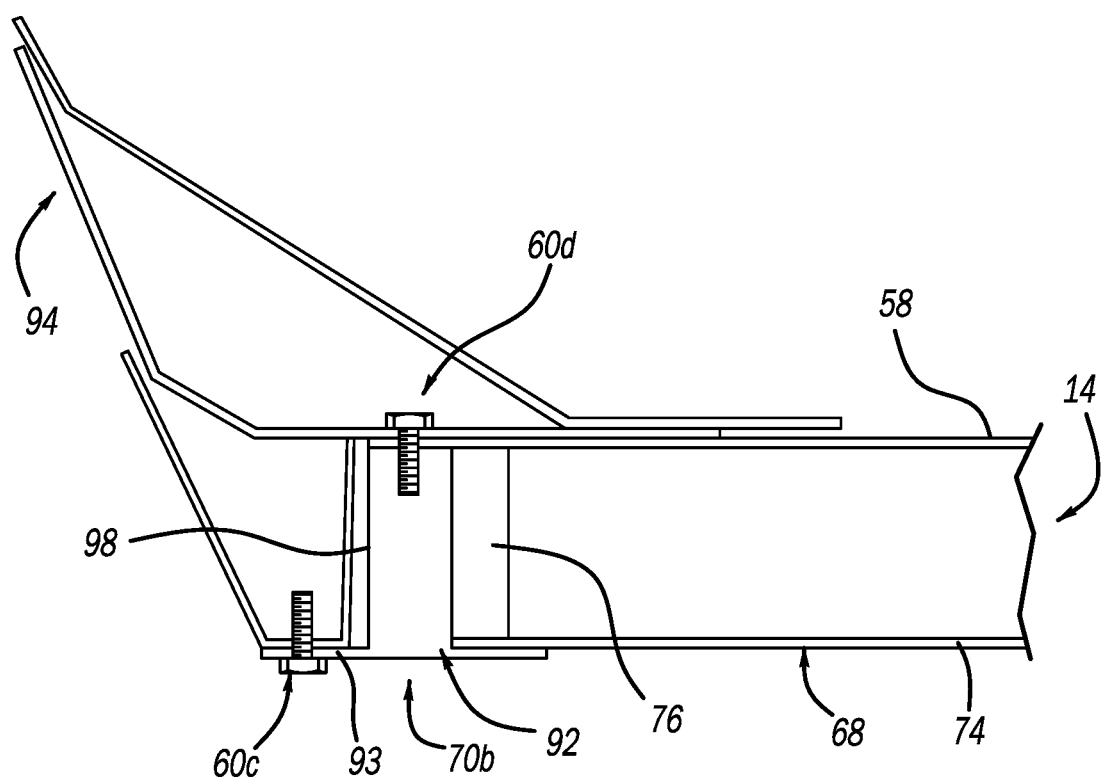
FIG. 5 is a cross-sectional view of a portion of the vehicle body secured to the battery structure of FIG. 1.

The battery structure 14 may be disposed at various locations of the vehicle 10 and may be secured to the vehicle body 12 via a plurality of fasteners 60a, 60b, 60c, 60d (60d is shown in FIG. 5). In the example provided, the fasteners 60a, 60b, 60c, 60d are threaded fasteners (e.g., bolts or machine screws), though other types of fasteners can be used. In this way, the battery structure 14 is supported by the vehicle body 12 at attachment points in multiple planes, as discussed in greater detail below, and is remote from a passenger cabin and cargo compartments (not shown) of the vehicle 10, therefore, not occupying space that would otherwise be available for passengers or cargo. The battery structure 14 powers one or more motors to drive a set of drive wheels. For example, the battery structure 14 may power a rear motor (not shown) to drive rear wheels (not shown) of a set of rear wheels via a rear axle (not shown) and/or may power a front motor (not shown) to drive front wheels (not shown) of a set of front wheels via a front axle (not shown).

With reference to FIGS. 2-4B, the battery structure 14 includes one or more battery arrays 66, a battery tray or housing 68, and mounting structures or frames 70a, 70b, 70c. The battery housing 68 is an enclosure which provides a structural surrounding and sealed compartment for the battery arrays 66 and other battery components (not shown) such as cooling lines, support brackets, and wiring disposed therein. The battery arrays 66 are disposed within the battery housing 68 and may be rechargeable and may include lithium-ion batteries or any other suitable electrical power storage units. In some forms, the battery arrays 66 are stacked on top of each other within the battery housing 68.

The battery housing 68 includes the lid 58, side walls 76, and a seal (not shown). The lid 58 is removably coupled to the side walls 76 via mechanical fasteners such as bolts or screws (not shown), for example. In this way, the lid 58 may be removed to service the battery arrays disposed within the battery housing 68.

A bottom wall 74 supports the battery arrays 66 disposed within the battery housing 68 and is secured to lower portions of the side walls 76. For example, the bottom wall 74 is secured to the lower portions of the side walls 76 and/or the mounting structures 70a, 70b, 70c via welding, an adhesive, or any other suitable attachment means. The side walls 76 are manufactured via stamping, for example, and extend in a vertical direction. The side walls 76 define an outer boundary of the battery housing 68 and are secured to each other via welding or an adhesive, for example. The seal is disposed around a periphery of the side walls 76 of the battery housing 68 and is engaged with side walls 76 and the lid 58. In this way, fluids, debris and other materials are inhibited from entering into the battery housing 68.

Figure 2:
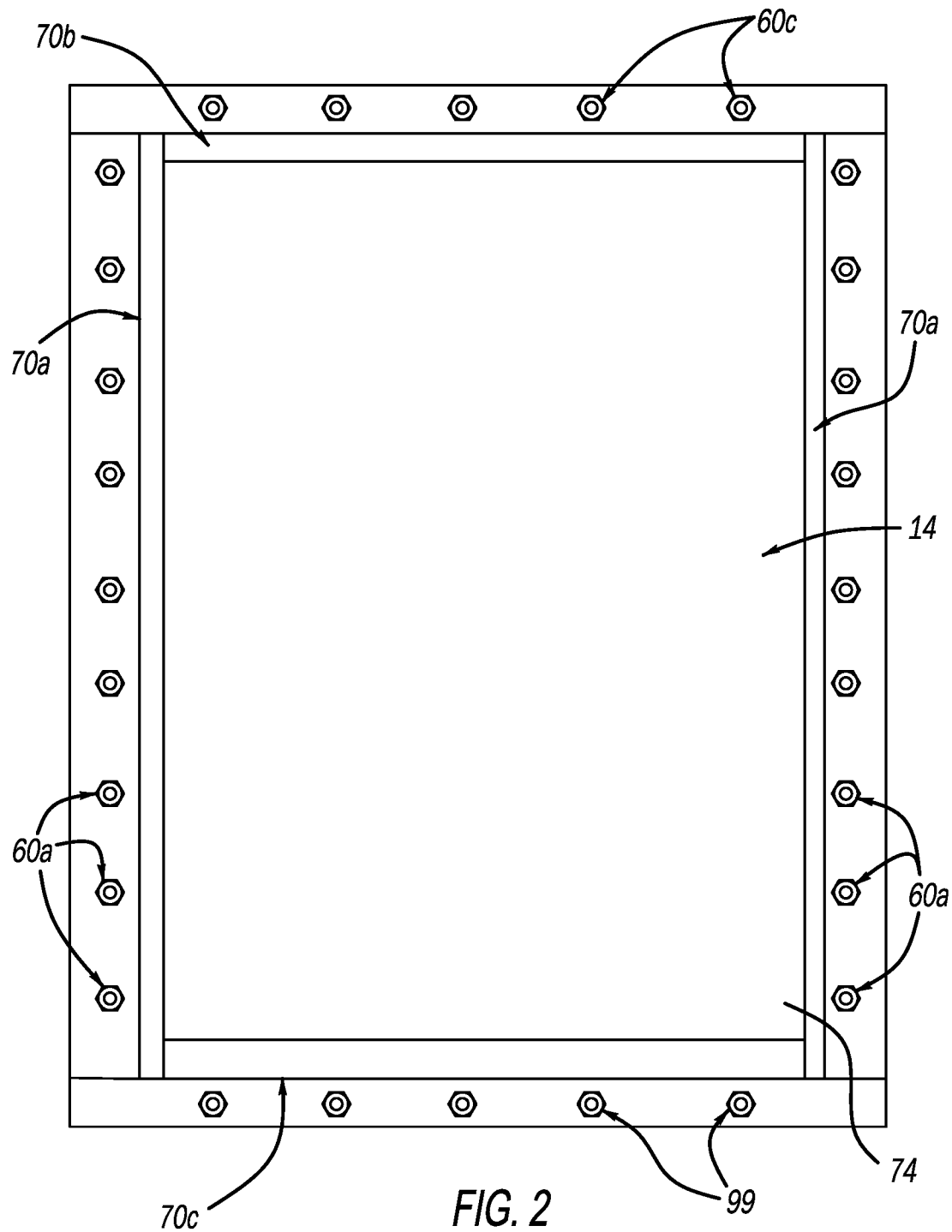
FIG. 2 is a bottom view of the battery structure secured to the vehicle body of FIG. 1.

Each mounting structure 70a, 70b, 70c is made of a metal material such as aluminum, for example, and is secured to a periphery of the battery housing 68. For example, as shown in FIG. 2, the mounting structures 70a are secured to sides of the battery housing 68, the mounting structure 70b is secured to a front end of the battery housing 68, and the mounting structure 70c is secured to a rear end of the battery housing 68. Each mounting structure 70a, 70b, 70c is also configured to mount the battery housing 68 to the vehicle body 12. The mounting structures 70a extend substantially an entire length of the sides of the battery housing 68, the mounting structure 70b extends substantially an entire length of the front end of the battery housing 68, and the mounting structure 70c extends substantially an entire length of the rear end of the battery housing 68.

With reference to FIGS. 3, 4A, and 4B, each mounting structure 70a includes a body portion 80 and a flange portion 82. In the example illustrated, the body portion 80 engages the body portion 44 of a respective rocker 40. In some forms, the body portion 80 is spaced apart from the body portion 44 of the respective rocker 40. In some forms, the body portion 80 has a width that is substantially equal to or greater than a width of the body portion 44 of the respective rocker 40. In the example illustrated, the body portion 80 has a width that is less than a width of the body portion 44 of the respective rocker 40. The body portion 80 also has a height that is less than a height of the body portion 44 of the respective rocker 40. The body portion 80 includes an outboard vertical wall 84, an inboard vertical wall 86 and one or more internal stiffening members 88 connecting the outboard vertical wall 84 and the inboard vertical wall 86 to each other.

In the example illustrated, the internal stiffening members 88 include webbing extending in a horizontal direction and connecting the outboard vertical wall 84 and the inboard vertical wall 86 to each other. In some configurations, the internal stiffening members 88 may extend in an oblique direction, in addition to, or instead of, the horizontal direction. In other examples, a foam material may be provided instead of, or in addition to, the internal stiffening members 88 to further absorb energy during a side vehicle impact event.

The flange portion 82 extends outwardly toward the respective rocker 40 from a lower section 90 of the body portion 80 and is supported by the body portion 44 of the respective rocker 40 via fasteners 60a. Stated differently, the flange portion 82 extends outwardly from the outboard vertical wall 84 of the body portion 80 and engages a lowermost region of the body portion 44 of the respective rocker 40. In this way, the respective rocker 40 and the respective mounting structure are arranged in a side-by-side configuration. The flange portion 82 is flat and defines a plane X2 (FIG. 3) extending in a horizontal direction. The plane X2 is located below the plane X1. In other words, the plane X2 can be parallel to and offset from the plane X1.

As shown in FIG. 5, the mounting structure 70b includes a body portion 92 and a flat flange portion 93. In the example illustrated, the body portion 92 is a single, solid structure that is secured to a lower portion of a vehicle dash panel 94. The vehicle dash panel 94 separates an occupant cabin (not shown) and the front end of the vehicle 10 (i.e., the region of the vehicle 10 known as the engine bay in a traditional, front engine internal combustion engine vehicle, and often utilized as a "frunk" in battery electric vehicles. In some forms, the body portion 92 can have a cavity including internal stiffening members (not shown, e.g., similar to the internal stiffening members 52 of FIGS. 3 and 4A) disposed therein, for example. The flange portion 93 extends outwardly toward the front end from a lower section of the body portion 92 and is supported by the vehicle dash panel 94 via fasteners 60c. Stated differently, the flange portion 93 extends outwardly from a forward wall 98 of the body portion 92 and engages a lowermost region of the vehicle dash panel 94.

It should be understood that the mounting structure 70c is secured to a rear of the vehicle body 12 via a plurality of fasteners 99. In the example provided, the fasteners 99 are threaded fasteners (e.g., bolts or machine screws), though other types of fasteners can be used. In this way, the battery structure 14 is secured to the vehicle body 12 along its entire periphery. The mounting structure 70c may be similar or identical to the mounting structures 70a, 70b described above, and therefore, will not be described in detail.

With reference to FIGS. 2 and 3, the fasteners 60a are aligned along a longitudinal direction of the electric vehicle 10 (FIG. 2). Each fastener 60a extends through the flange portion 82 of a respective mounting structure 70a and a bottom portion of a respective rocker 40, thereby forming an attachment point securing the battery structure 14 to the vehicle body 12 along plane X2. In the example provided, the bottom portion of the respective rocker 40 is tapped to threadably engage each fastener 60a, though other configurations can be used, such as a separate nut (not shown) for example. The fasteners 60b are aligned along a longitudinal direction of the electric vehicle 10. The fasteners 60b are located inboard relative to the fasteners 60a. Each fastener 60b extends through the flange portion 46 of a respective rocker 40 and a top portion of a respective mounting structure 70a, thereby forming an attachment point securing the battery structure 14 to the vehicle body 12 along plane X1. In the example provided, the top portion of the respective rocker 40 is tapped to threadably engage each fastener 60b, though other configurations can be used, such as a separate nut (not shown) for example. The attachment point formed by the fastener 60b is vertically offset from the attachment point formed by the fastener 60a.

With reference to FIGS. 2 and 5, the fasteners 60c are aligned along a longitudinal direction of the mounting structure 70b (i.e., the longitudinal direction of the mounting structure 70b extends perpendicular to the longitudinal direction of the electric vehicle 10). Each fastener 60c extends through the flange portion 93 of a respective mounting structure 70b and a bottom portion of the dash panel 94, thereby securing the battery structure 14 to the vehicle body 12. In the example provided, the bottom portion of the dash panel 94 is tapped to threadably engage each fastener 60c, though other configurations can be used, such as a separate nut (not shown) for example. The fasteners 60d are aligned along a longitudinal direction of the mounting structure 70b. The fasteners 60d are located inboard relative to the fasteners 60c. Each fastener 60d extends through the dash panel 94 and a top portion of a respective mounting structure 70b, thereby securing the battery structure 14 to the vehicle body 12 at a location that is inboard and above the location at which the fasteners 60c secure the battery structure 14 to the vehicle body 12. In the example provided, the top portion of the respective mounting structure 70b is tapped to threadably engage each fastener 60d, though other configurations can be used, such as a separate nut (not shown) for example.

With reference to FIGS. 4A, 4B, and 5, a method for securing the battery structure 14 to the vehicle body 12 will be described in detail. First, the battery structure 14 is inserted into the vehicle body 12 from below. Next, the fasteners 60a are inserted through a respective mounting structure 70a and a respective rocker 40 as described above to secure the battery structure 14 to the vehicle body 12, fasteners 60c through a respective mounting structure 70b and the dash panel 94 as described above to secure the battery structure 14 to the vehicle body 12, and fasteners 99 through a respective mounting structure 70c and the vehicle body 12 to secure the battery structure 14 to the vehicle body 12. Next, the fasteners 60b are inserted through the respective rocker 40 and the respective mounting structure 70a as described above to further secure the battery structure 14 to the vehicle body 12, and the fasteners 60d through the dash panel 94 and the respective mounting structure 70b as described above to further secure the battery structure 14 to the vehicle body 12.

A structural assembly of the present disclosure comprises the vehicle body 12 and the battery structure 14. The battery structure 14 being attached to the vehicle body 12 as disclosed herein provides for improved stiffness, and more efficient load paths during vehicle impact events. The mounting structures 70a, 70b, 70c being arranged in side-by-side configuration with the rockers 40 of the vehicle body 12 also provides for packaging improvements, which leads to a reduction in ground clearance between the vehicle body 12 and a ground surface.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly for an electric vehicle, the structural assembly comprising:
 a vehicle body including opposed rockers;
 a battery structure disposed between the opposed rockers and configured to house power storage units;
 a pair of mounting structures, each mounting structure of the pair of mounting structures secured to a respective side of the battery structure;
 a plurality of lower fasteners, each lower fastener extending through a lower portion of a respective mounting structure and a bottom portion of a respective rocker of the vehicle body to secure the battery pack to the vehicle body; and
 a plurality of upper fasteners, each upper fastener extending through an upper portion of the respective rocker and a top portion of the respective mounting structure to secure the battery pack to the vehicle body,
 wherein the upper fasteners secure the battery pack and the vehicle body at an upper attachment point and the lower fasteners secure the battery pack and the vehicle body at a lower attachment point, the lower attachment point is vertically offset from the upper attachment point.

2. The structural assembly of claim 1, wherein the upper fasteners are located inboard of the lower fasteners.

3. The structural assembly of claim 1, wherein the respective rocker and the respective mounting structure are arranged in a side-by-side configuration.

4. The structural assembly of claim 1, wherein the respective rocker has a width that is greater than a width of the respective mounting structure.

5. The structural assembly of claim 1, wherein the respective rocker and the respective mounting structure include internal stiffening members.

6. The structural assembly of claim 1, wherein the respective rocker has a height that is greater than a height of the respective mounting structure.

7. The structural assembly of claim 1, wherein:
 the respective rocker includes a first body portion and a first flange portion, the first flange portion extends inwardly from the first body portion and engages the battery structure; and
 the respective mounting structure includes a second body portion and a second flange portion, the second flange portion extends outwardly from the second body portion and engages the respective rocker.

8. The structural assembly of claim 7, wherein the first body portion and the second body portion are spaced apart from each other.

9. The structural assembly of claim 7, wherein the first body portion and the second body portion include internal stiffening members.

10. The structural assembly of claim 7, wherein the respective rocker is supported on the second flange portion of the respective mounting structure.

11. The structural assembly of claim 7, wherein:
 each lower fastener extends through second flange portion of the respective mounting structure and the bottom portion of the respective rocker of the vehicle body; and
 each upper fastener extends through the first flange portion of the respective rocker and the top portion of the respective mounting structure.

12. A structural assembly for an electric vehicle, the structural assembly comprising:
 a vehicle body including opposed rockers, each rocker of the opposed rockers including a first body portion and a first flange portion, the first flange portion extending inwardly from the first body portion;
 a battery structure disposed between the opposed rockers and configured to house power storage units;
 a pair of mounting structures, each mounting structure of the pair of mounting structures secured to a respective side of the battery structure and including a second body portion and a second flange portion, the second flange portion extending outwardly from the second body portion;
 a plurality of lower fasteners, each lower fastener extending through the second flange portion of a respective mounting structure and a bottom portion of a respective rocker of the vehicle body to secure the battery pack to the vehicle body; and
 a plurality of upper fasteners, each upper fastener extending through the first flange portion of the respective rocker and a top portion of the respective mounting structure to secure the battery pack to the vehicle body,
 wherein the upper fasteners are located inboard of the lower fasteners.

13. The structural assembly of claim 12, wherein the first body portion and the second body portion are spaced apart from each other.

14. The structural assembly of claim 12, wherein the first body portion and the second body portion include internal stiffening members.

15. The structural assembly of claim 12, wherein the respective rocker is supported on the second flange portion of the respective mounting structure.

16. The structural assembly of claim 12, wherein the respective rocker and the respective mounting structure are arranged in a side-by-side configuration.

17. A structural assembly for an electric vehicle, the structural assembly comprising:
- a battery structure configured to be disposed between opposed rockers of a vehicle body and configured to house power storage units;
- a pair of mounting structures, each mounting structure of the pair of mounting structures secured to a respective side of the battery structure;
- a plurality of lower fasteners, each lower fastener extending through a lower portion of a respective mounting structure and configured to extend through a respective rocker of the vehicle body to secure the battery pack to the vehicle body; and
- a plurality of upper fasteners, each upper fastener configured to extend through the respective rocker and extending through a top portion of the respective mounting structure to secure the battery pack to the vehicle body,
- wherein the lower fasteners are aligned along a longitudinal direction of the electric vehicle, and
- wherein the upper fasteners are located inboard of the lower fasteners.

18. The structural assembly of claim 17, wherein the respective mounting structure includes internal stiffening members.

19. The structural assembly of claim 17, wherein the respective mounting structure includes a body portion and a flange portion, the flange portion extends outwardly from the body portion and engages the respective rocker.

20. The structural assembly of claim 17, wherein the lower portion is a flange portion, and wherein each lower fastener extends through the flange portion of the respective mounting structure and configured to extend through the respective rocker of the vehicle body to secure the battery pack to the vehicle body.

* * * * *